United States Patent [19]

Kawazoe

[11] Patent Number: 4,648,697
[45] Date of Patent: Mar. 10, 1987

[54] ADAPTER FOR TRIPODS

[76] Inventor: Michio Kawazoe, 30-11 5-chome, Narita Higashi, Suginami-ku, Tokyo, Japan

[21] Appl. No.: 737,225

[22] Filed: May 22, 1985

[30] Foreign Application Priority Data

Mar. 19, 1985 [JP] Japan .............................. 60-40449[U]

[51] Int. Cl.⁴ ...................... G03B 17/56; G03B 15/03; F16M 11/26
[52] U.S. Cl. .................................. 354/293; 354/126; 362/3; 248/171
[58] Field of Search ................... 354/81, 293, 126, 82; 248/169, 171; 16/110 R; 362/3

[56] References Cited

U.S. PATENT DOCUMENTS

| | | | |
|---|---|---|---|
| 3,586,278 | 6/1971 | Simons | 354/81 |
| 4,030,114 | 6/1977 | Telfer | 354/81 |
| 4,289,393 | 9/1981 | Kawazoe | 354/293 |
| 4,309,099 | 1/1982 | Flint | 354/293 |
| 4,324,477 | 4/1982 | Miyazaki | 354/293 |

Primary Examiner—A. A. Mathews
Attorney, Agent, or Firm—Donald D. Mon

[57] ABSTRACT

An adaptor for tripods which can be used for close up photography, low angle photography, and for supporting cameras or lights. The adaptor has first and second sliders movably clamped on a leg of a tripod. A handle is pivotably mounted to the first slider and pivots between a first position bridging the first and second sliders and a second position extending outwardly from the tripod leg. A threaded screw on the free end of the handle opposite the pivoted end can secure the free end of the handle to the second slider when the handle is in the first position. The threaded screw permits mounting of cameras or accessories when the handle is in the second position.

3 Claims, 8 Drawing Figures

ADAPTER FOR TRIPODS

FIELD OF THE INVENTION

This invention relates to an adapter for carrying a tripod, which can also be used for close up photography, copy photograph, low angle photography, and for supporting two cameras or lights etc. on one tripod.

BACKGROUND OF THE INVENTION

Heretofor, tripods, especially large size or middle size tripods, are carried by grasping one leg in the folded state, but this is inconvenient. Moreover, with present tripods it is impossible to support a camera or light except a pan head and it is also not possible to support more than one camera or light.

BRIEF DESCRIPTION OF THE INVENTION

The purpose of this invention is to eliminate these drawbacks and to provide a tripod adapter to ease carrying a tripod, which makes it possible to support a video or still camera, lights, etc., or another part of a pan head, at a low position when the legs are retracted for low angle, or close up photography.

The above and other features of the invention will be fully understood from the following detailed description and the accompanying drawings in which:

BRIEF DESCRIPTION OF THE DRAWINGS

FIG. 6 is a perspective of handle slider 3a.

DETAILED DESCRIPTION OF THE INVENTION

Figure 1:
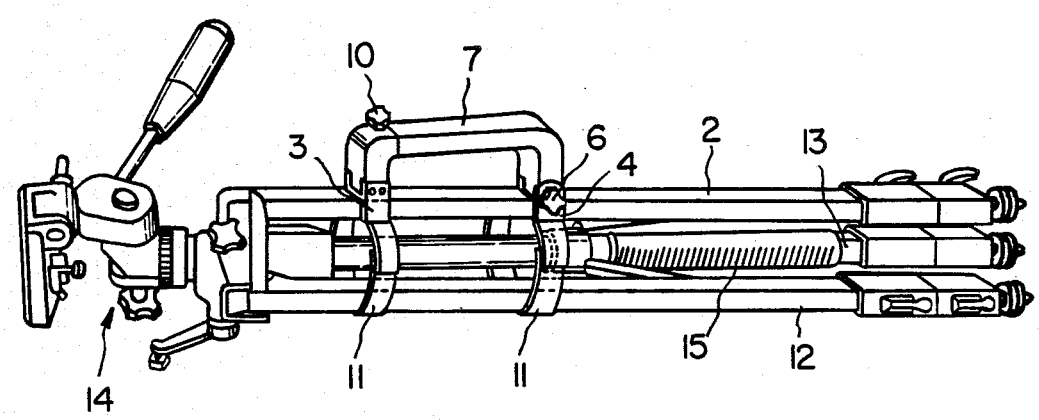
FIG. 1 is a side view of one embodiment of this invention in a folded state.
Figure 2:
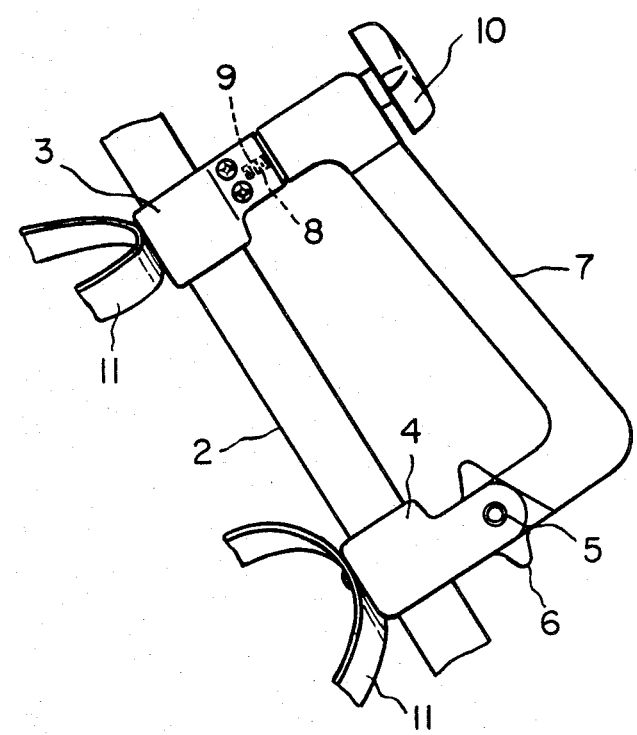
FIG. 2 is an enlarged view of an essential part of the embodiment of FIG. 1.
Figure 3:
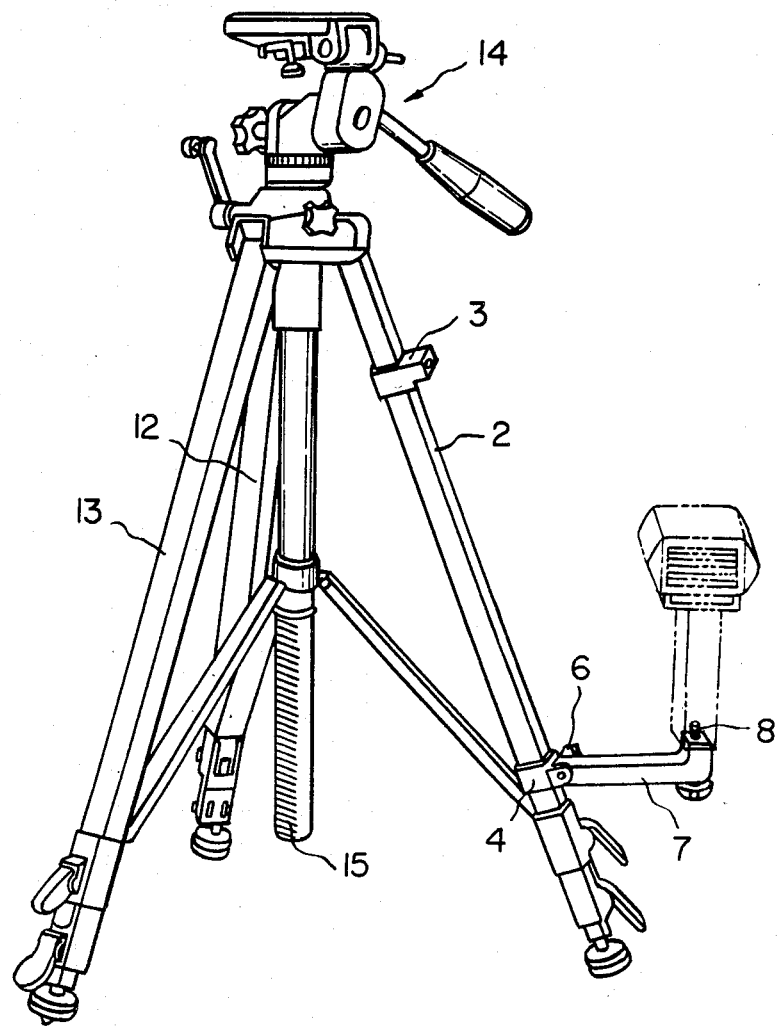
FIG. 3 is a perspective view of the handle in an opened state.

As shown in FIGS. 1–3, one leg 2 of a tripod body supports a pair of sliders 3 and 4. One slider 3 is fixed on leg 2, while the other slider 4 is slidably mounted and secured at any desired position by securing or clamping screw 5. Handle 6 is for tightening screw 5. On slider 4, U-shaped handle 7 is pivotally attached with screw 8 mounted on the other end of the handle 7, for engaging female threaded hole 9 provided on slider 3. Handle 7 is not limited to a U-shape but may be L-shaped, curved shaped or any another convenient shape. Sliders 3 and 4 may be connected to each other. Handle 10 is for rotating and tightening screw 8. Bands 11 on the opposite sides of sliders 3, 4 are for banding legs 2, 12, 13 together in the folded position. Pan head 14 is provided on the tripod as is elevator 15. These parts are the same as on a conventional tripod.

Operation of the device is as follows:

As shown in FIG. 1, in the carrying position, legs 2, 12, 13 are retracted and folded with screw 8 engaged in female threaded hole 9 of slider 3 and handle 7 securely connected. The tripod body may now be easily carried with handle 7. Preferably the legs are secured by band 11.

In use, as shown in FIG. 3 legs 2,12, 13 are spread and extended and screw 8 is disengaged from female threaded hole 9 and loosened so that slider 4 can be moved freely on leg 2. Slider 4 may be moved to the lower part of leg 2 with handle 7 rotated outwardly to a horizontal position so that threaded screw 8 points upwardly. Therefore, it is possible to connect a camera, strobo light or pan head 14 on screw 8. If legs 2, 12, 13 are retracted they are at a lower position. A strobo light attached to screw 8 of handle 7 is shown in FIG. 3. If a pan head 14 is secured on screw 8 and a camera mounted on the pan head and turned in a downward direction, the camera would face toward the ground and copy photographs are possible.

Figure 4:
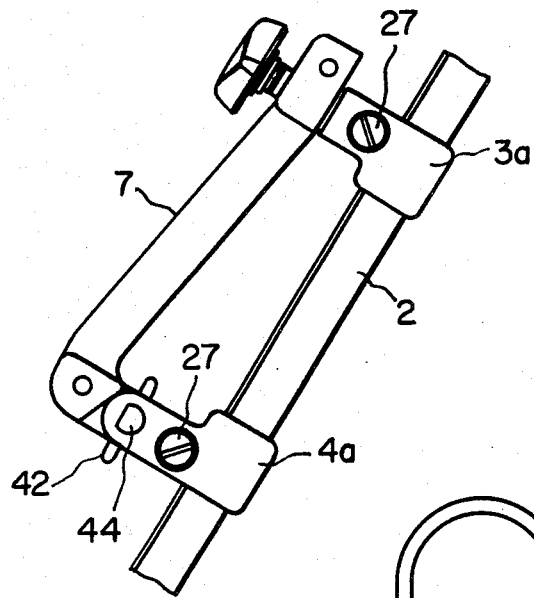
FIG. 4 is a side view of another embodiment of the invention.
Figure 5:
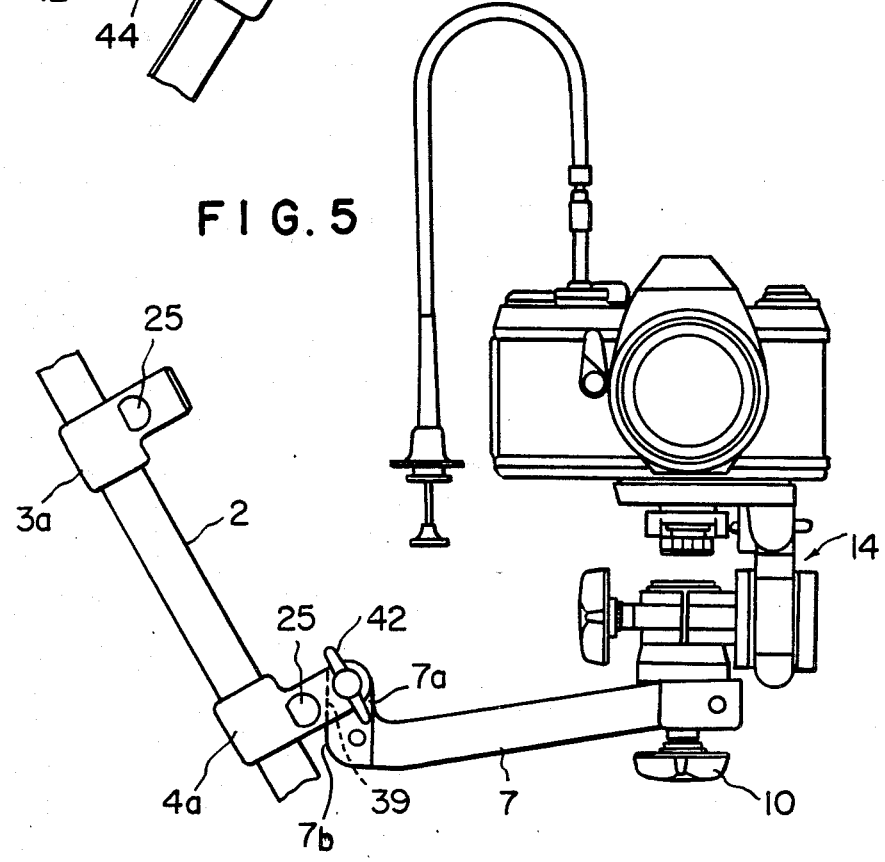
FIG. 5 is a side view of the embodiment of FIG. 4 with the handle in an opened state.
Figure 6A:
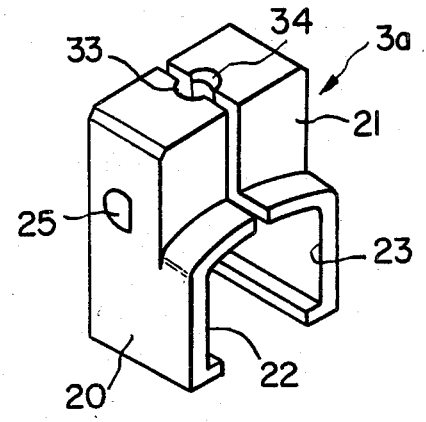
Figure 6B:
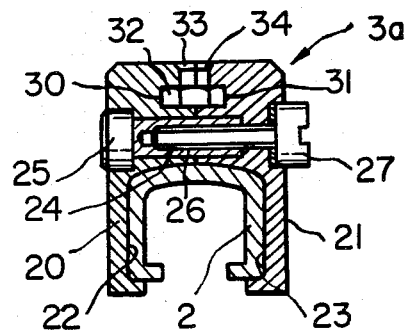
FIG. 6b and 6c are crossectional views of sliders 3a, 4a, respectively.

Another embodiment of the invention is shown in FIGS. 4, 5, and 6. As shown in FIGS. 6a and 6b, slider 3a is constructed from a pair of symmetric half parts 20, 21. These oppositely configured half parts 20, 21 have cavities 22, 23 forming a shallow fit around leg 2. A sleeve 25 having threaded hole 24 is secured to the upper part of half 20 and threaded bolt 26 having head 27 is rotatably inserted in the other half 21. Bolt 26 may be threaded to sleeve 25 and rotated by engaging a recess provided on head 27 with a coin. By securing bolt 26, slider 3a is secured on leg 2, while loosening bolt 26, permits slider 3a to slide along leg 2. By further loosening bolt 26, halfs 20, 21 are further separated allowing slider 3a to be removed from leg 2. However, bolt 26 cannot escape from sleeve 25.

A pair of recesses 30, 31 are provided on opposing faces of said halfs 20, 21 and a nonrotatable nut 32 for engaging screw 8 is inserted in recesses 30, 31. A pair of semicircular recesses 33, 34 are provided on the faces for receiving screw 8 inserted in nut 32.

Figure 6C:
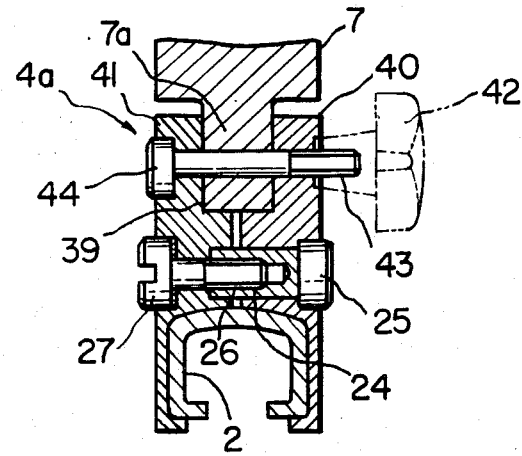

As shown in FIG. 6c, slider 4a is also constructed substantially of a pair of half parts similar to slider 3a having a female threaded hole 24 and a similar threaded bolt 26. Bearing plates 40, 41 are provided at the upper parts of slider 4a and an end 7a of handle 7 pivoted about bolt shaft 44 is inserted into the space 39 between bearing plates 40, 41. Bolt 44 has a threaded portion 43 at its projecting end secured by threaded knob 42 for securing handle 7. As shown in FIG. 5, handle 7 at a horizontal position has side face 7b in contact with the bottom of space 39.

Operation of the latter embodiment is the same as the embodiment of FIGS. 1–4. Pan head 14 is shown secured on handle 7 in FIG. 5 with a camera mounted on the pan head. Operation of pan head 14 permits the camera to be directed downward making possible copy photographing. Loosening of bolt 26 completely allows halfs 20, 21 to separate enough to permit opposite sides of leg 2 to escape from cavity 22, 23 allowing it to be removed.

As explained above with this invention, it is possible to carry a tripod with the handle adapter and it is possible to mount a camera or light on another part or a pan head and two cameras or a light can be mounted on one tripod. The main utilities of this invention are summarized as follows;

1. Carrying.
2. As a stand for a low position electric flash.
3. As an instant stand for low angle photography.
4. As a simple copy stand for close-up photographs.
5. As an additional light arc/mount for a video light.

I claim:

1. An adapter for tripods comprising; a first slider means movably clamped on a leg of said tripod; a second slider means movably clamped on said tripod leg; handle means pivotably mounted on said first sllider means for pivotal movement bridging said first and second sliders in a closed position to a second position extending outward from said leg; screw threaded means on the end of said handle means for securing the free end of said handle to said second slider means when bridging said sliders; said screw threaded means permitting mounting of camera accessories when said handle is in its extended position.

2. The adaptor according to claim 1 including bands on each of said first and second slider means for banding and securing said tripod legs in a folded position.

3. The adaptor according to claim 1 in which said first and second slider means comprise; mating split clamp halves having cavities which fit the contour of one of said tripod legs; a threaded sleeve in one of said split clamp halves; a bolt having a head with a large recess passing through the other of said split clamp halves and being threaded into said sleeve whereby said sliders may be easily released and reclamped on said tripod leg.

* * * * *